US011618562B2

(12) United States Patent
Beloussov et al.

(10) Patent No.: US 11,618,562 B2
(45) Date of Patent: Apr. 4, 2023

(54) SYSTEMS AND METHODS FOR SUBDUING TARGET INDIVIDUALS USING UNMANNED AERIAL VEHICLES

(71) Applicant: Acronis International GmbH, Schaffhausen (CH)

(72) Inventors: Serguei Beloussov, Costa del Sol (SG); Oleg Melnikov, Kirkland, WA (US)

(73) Assignee: Acronis International GmbH, Schaffhausen (CH)

( * ) Notice: Subject to any disclaimer, the term of this patent is extended or adjusted under 35 U.S.C. 154(b) by 249 days.

(21) Appl. No.: 16/833,538

(22) Filed: Mar. 28, 2020

(65) Prior Publication Data

US 2021/0300549 A1  Sep. 30, 2021

(51) Int. Cl.
*B64C 39/02* (2006.01)
*B64D 1/18* (2006.01)

(52) U.S. Cl.
CPC ............. *B64C 39/024* (2013.01); *B64D 1/18* (2013.01); *B64C 2201/121* (2013.01); *B64C 2201/127* (2013.01)

(58) Field of Classification Search
None
See application file for complete search history.

(56) References Cited

U.S. PATENT DOCUMENTS

2017/0177925 A1\* 6/2017 Volkart .................. G06V 20/13
2018/0322749 A1\* 11/2018 Kempel ............... G05D 1/0094

FOREIGN PATENT DOCUMENTS

KR          101997680 B1 \*  7/2019  ........... B64C 39/024
WO     WO-2019093967 A1 \*  5/2019  ........... B05B 13/005

OTHER PUBLICATIONS

Hutchinson, M., Liu, C., & Chen, W. H. (2019). Source term estimation of a hazardous airborne release using an unmanned aerial vehicle. Journal of Field Robotics, 36(4), 797-817. Retrieved from https://dialog.proquest.com/professional/docview/2234354198?accountid=131444 (Year: 2019).\*

\* cited by examiner

*Primary Examiner* — Gregory S Cunningham, II
(74) *Attorney, Agent, or Firm* — ArentFox Schiff LLP; Michael Fainberg

(57) ABSTRACT

Disclosed herein are systems and method for subduing target individuals using unmanned aerial vehicles (UAVs) comprises deploying one or more UAVs to a location of an individual. The method obtains information about the individual from the one or more UAVs and external sources. The method assigns an aggression factor to the individual based on the obtained information. In response to determining that the aggression factor is greater than an aggression threshold, the method prepares a neutralization action designed to reduce the aggression factor of the individual by: identifying one or more exception conditions of the individual, and selecting, from a plurality of neutralization actions that the one or more UAVs are capable of performing, a neutralization action based on the one or more exception conditions. The method then instructs the one or more UAVs to perform the selected neutralization action on the hostile individuals.

20 Claims, 10 Drawing Sheets

SYSTEMS AND METHODS FOR SUBDUING TARGET INDIVIDUALS USING UNMANNED AERIAL VEHICLES

FIELD OF TECHNOLOGY

The present disclosure relates to the field of security, and, more specifically, to systems and methods for using unmanned aerial vehicles (UAVs) for security and crowd control.

BACKGROUND

Hostile crowds can be very challenging to control. Protestors and activists have historically gotten aggressive during rallies and protests. However, suppressing any form of aggression has at times led to harmful actions by law enforcement. For example, officers may rely on pepper sprays and electrical weapons (e.g., tasers). Although these measures are not meant to fatally injure a target, they can do serious harm if not used properly. In a sudden hostile altercation, a law enforcement officer may in fact fail to make a sound decision on how to react, causing harm to the hostile individual(s), innocent bystanders, or himself/herself. For example, an officer may use pepper spray on an individual that is allergic to the spray, or may use an electrical weapon on an individual that has a medical condition sensitive to electrical currents (e.g., the individual may have a pacemaker). In order to address these issues, unmanned aerial vehicles (UAVs) such as drones may be used for security purposes such as for theft prevention, crowd control, etc.

SUMMARY

The present disclosure describes systems and methods for neutralizing hostile individuals harmlessly using unmanned aerial vehicles (UAVs) and a system for deployment and control of a fleet of such UAVs.

In one exemplary aspect, a method for neutralizing hostile individuals using unmanned aerial vehicles (UAVs) comprises deploying one or more UAVs to a location of an individual. The method obtains information about the individual from the one or more UAVs and external sources. The external sources may include law enforcement agencies, databases, news sources, etc. Accordingly, the obtained information may be any combination of motion data, images, depth data, criminal identities, event information (e.g., parades and concerts), etc. The method assigns an aggression factor to the individual based on the obtained information. In response to determining that the aggression factor is greater than an aggression threshold, the method prepares a neutralization action designed to reduce the aggression factor of the individual by: identifying one or more exception conditions of the individual, and selecting, from a plurality of neutralization actions that the one or more UAVs are capable of performing, a neutralization action based on the one or more exception conditions. The method then instructs the one or more UAVs to perform the selected neutralization action on the hostile individuals.

In some aspects, the method further captures a facial image of the individual and determines an identifier of the individual by performing facial recognition on the facial image.

In some aspects, identifying the one or more exception conditions of the individual comprises generating a whitelist database of VIP individuals from the external sources, wherein neutralization actions cannot be performed on the VIP individuals, and determining that the identifier is in the whitelist database, wherein the one or more exception conditions indicates that the individual is a VIP individual.

In some aspects, identifying the one or more exception conditions of the individual comprises generating a blacklist database of dangerous individuals from the external sources, and determining that the identifier is in the blacklist database, wherein the one or more exception conditions indicates that the individual is a dangerous individual.

In some aspects, identifying the one or more exception conditions of the individual comprises searching for, in a medical database, medical records of the individual using the identifier, and identifying the one or more exception conditions in the medical records of the individual.

In some aspects, identifying the one or more exception conditions of the individual comprises capturing an image of the individual, identifying, using object recognition, physical attributes of the individual, and predicting the exception condition based on the physical attributes of the individual.

In some aspects, the individual is a part of a plurality of hostile individuals in the location. The method further detects at least one other individual in the plurality of hostile individuals and determines that an aggression factor of the at least one other individual is greater than the aggression threshold. In response, the method identifies another exception condition of the at least one other individual, and selects, from the plurality of neutralization actions, another neutralization action for the at least one other individual based on the another exception condition. The method then instructs the one or more UAVs to perform the another neutralization action simultaneously with the neutralization action, wherein the neutralization action is different than the another neutralization action.

In some aspects, the neutralization action comprises spraying a first substance at the individual using a first spray gun of the UAV and the another neutralization action comprises spraying a second substance at the at least one other individual using a second spray gun of the UAV, wherein the second substance is not the same as the first substance.

In some aspects, the neutralization action comprises spraying a substance at the individual, which further comprises determining, using a depth sensor, a location of the individual and a distance between the individual and the UAV. The method then calculates a projection vector indicating a direction at which to spray the substance, determines a concentration of the substance that is safe for the individual based on the exception condition, adjusts the distance between the individual and the UAV to achieve the concentration, and sprays the substance along the projection vector such that the individual is exposed to the determined concentration.

In some aspects, calculating the projection vector further comprises determining an anticipated location of the individual, based on the obtained information of the individual, wherein the obtained information comprises motion data, and setting the projection vector along a position of the UAV and the anticipated location.

In some aspects, the exception condition comprises at least one of: age, a disability, an allergy, a disease, a pregnancy, reliance on medical equipment, a VIP status, a criminal status, and possession of a weapon.

In some aspects, subsequent to performing the neutralizing action, the method further determines whether the aggression factor of the individual has decreased below the aggression threshold based on motion data within a period of time. In response to determining that the aggression factor has not decreased below the aggression threshold, the method performs a secondary neutralizing action from the plurality of neutralization actions.

In some aspects, the neutralizing action is one of spraying a substance at the individual, playing a sound, aiming lights at the individual, sending an image of the individual to legal enforcement, and calling a legal enforcement officer.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for neutralizing hostile individuals using unmanned aerial vehicles (UAVs) and a system for deployment and control of a fleet of such UAVs. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
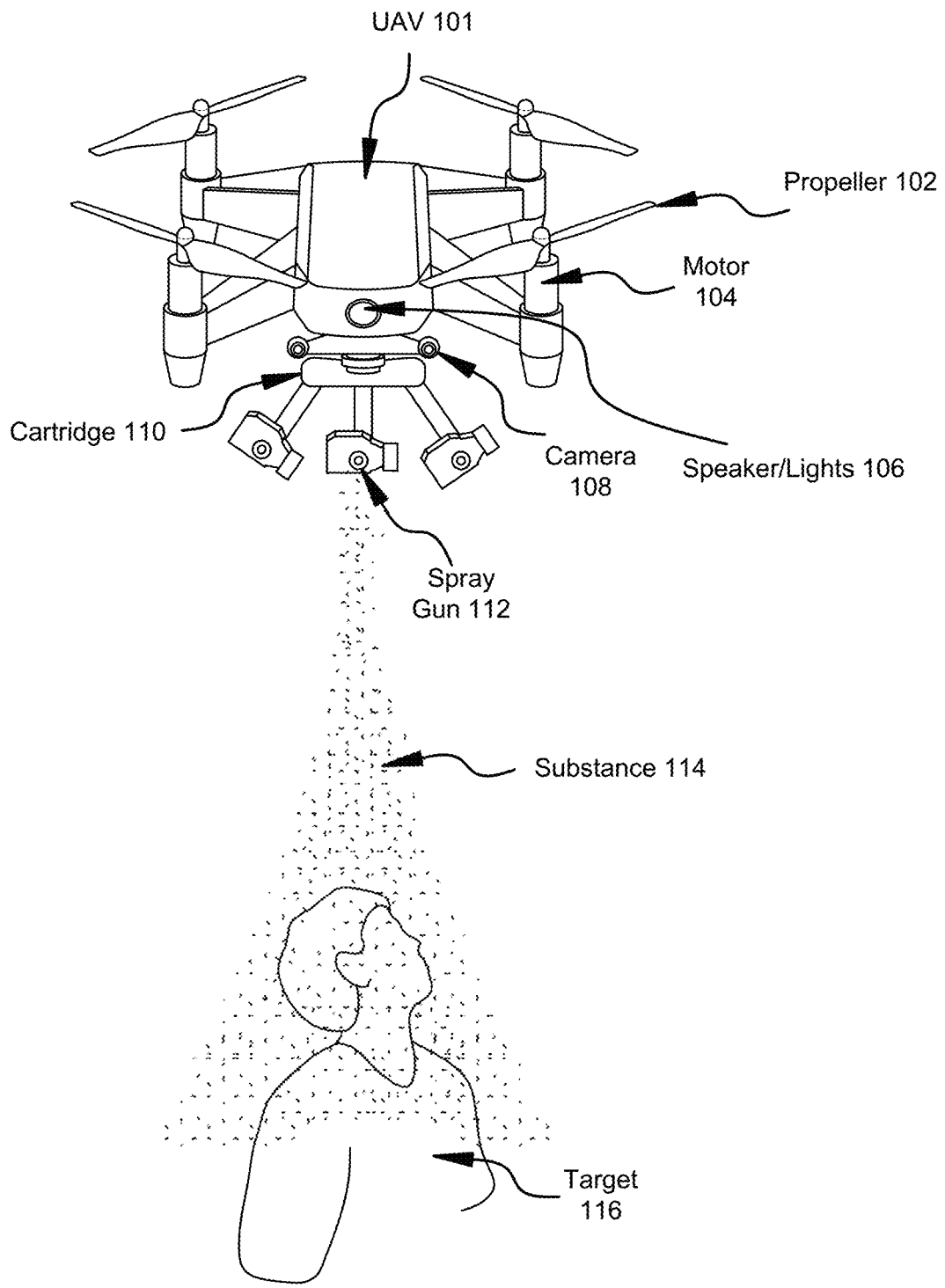
FIG. 1A illustrates a scenario for neutralizing a hostile individual harmlessly using a UAV, in accordance with aspects of the present disclosure.

FIG. 1A illustrates scenario 100 for neutralizing a hostile individual harmlessly using a UAV, in accordance with aspects of the present disclosure. Scenario 100 comprises UAV 101 and target 116. Target 116 may be an individual that is being hostile. It should be noted that although the examples provided in the present disclosure are largely focused on groups of people in a riot, the systems and methods are applicable when a single individual is being hostile. For example, target 116 may be a thief that is attempting to infiltrate a building. UAV 101 may be used as a security system that can detect target 116 and prevent such theft.

UAV 101 includes various hardware components including propeller 102 and motor 104, which in combination enable the flight capabilities of UAV 101. UAV 101 may be a drone, a helicopter, a plane, a jet, or any device capable of flight. In some aspects, the movements and altitude of UAV 101 are controlled remotely by a user (e.g., using a remote control) or by a remote control center. In some aspects, the movements and altitude are automated (e.g., using flight-based artificial intelligence (A.I.)).

UAV 101 further includes camera 108, cartridge 110 to store substance 114, and spray gun 112 for spraying substance 114. FIG. 1 depicts two cameras, three spray guns, and one cartridge. However, this is only show for simplicity. In some aspects, there may be more or fewer (so long as there is at least one of each) cameras, spray guns, and cartridges, respectively. The placement of camera 108 may be such that a 360 degree view can be acquired of the environment that UAV 101 is flying in. This may be achieved with a single 360-degree camera, two at-least-180-degree cameras, three at-least-120-degree cameras, etc. Camera 108 may include a built-in microphone to record audio of the environment.

Likewise, spray gun 112 may comprise multiple spray guns, each connected to a different portion of cartridge 110 (which, in some aspects, may each contain a different substance). The spray guns may collectively cover 360-degrees of spray area. In some aspects, spray gun 112 can be rotated and repositioned automatically or via remote control.

Substance 114 is one approach to neutralize target 116. Substance 114 may be a liquid (e.g., water), a mist (e.g., pepper spray), or a gas (e.g., with a pungent smell). The purpose of substance 114 is to deter target 116 from congregating with other hostile individuals and/or to motivate target 116 to flee environment 116.

In some aspects, UAV 101 may comprise speaker/lights 106. The speaker may be used to generate sound including verbal warnings such as "Stop Right There!" and alarms such as a high-frequency siren. The light source may be used to illuminate the faces of individuals in dark environments (e.g., during night-time usage). The light source may also be used to temporarily emit high-intensity light to deter target 116 from making aggressive movements. For example, if a high-intensity light is directed at target 116, target 116 may be motivated to stand still and block the light using his/her hands.

Figure 1B:
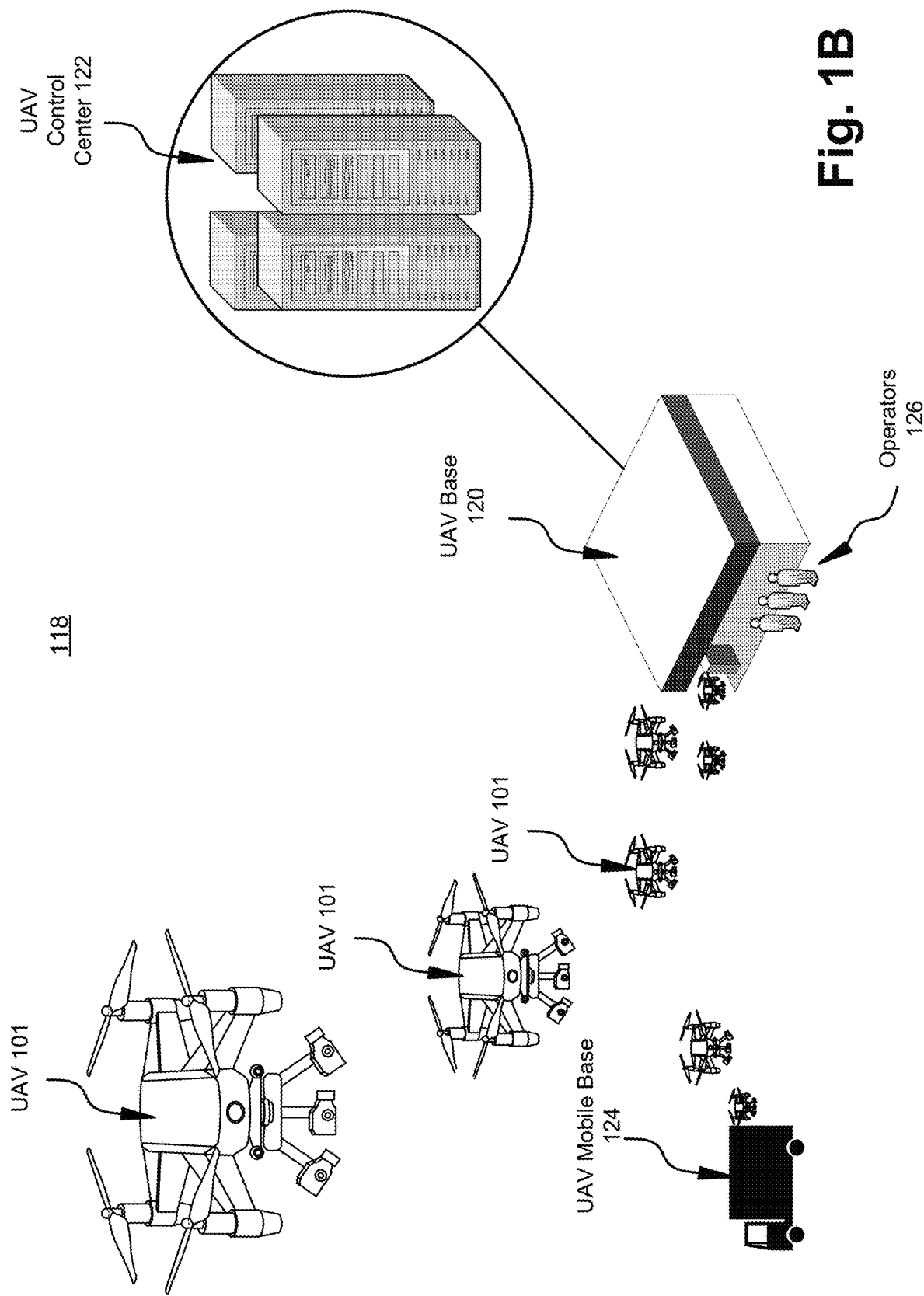
FIG. 1B illustrates a scenario for deploying a plurality of UAVs, in accordance with aspects of the present disclosure.

FIG. 1B illustrates scenario 118 for deploying a plurality of UAVs, in accordance with aspects of the present disclosure. Scenario 118 comprises a UAV base 120 that may store a plurality of UAV 101s. UAV base 120 may be a stationary warehouse that also comprises UAV control center 122. Control center 122 comprises server(s) configured to deploy one or more UAV 101s to a location of an individual (e.g., where the riot is occurring). The servers of control center 122 may track the locations of each UAV 101 and wirelessly communicate with each UAV 101 to perform a variety of processing commands. In some aspects, a subset of UAVs may be stored on a mobile base 124 that carries the subset of UAVs to the location of the individual (or nearby). Mobile base 124 may also comprise servers that can communicate with both the subset of UAVs and control center 122 to relay information between the two entities. In some aspects, the servers on mobile base 124 may create an ad hoc network with the plurality of UAVs, without needing to communicate with control center 122.

In some aspects, control center 122 may receive global positioning system (GPS) data from each of the plurality of UAVs to determine their current locations. Control center 122 may then transmit route data to guide the UAVs to the location. In some aspects, control center 122 may elect a UAV from the plurality of UAVs as a manager UAV. The manager UAV may be configured to receive GPS data from each of the other UAVs in the plurality of UAVs and transmit them to control center 122. The manager UAV may then receive instructions from control center 122 and transmit the instructions to the other UAVs. Each UAV of the plurality of UAVs may be assigned an identifier. Thus, control center 122/manager UAV may transmit messages with a header indicating the identifier of the UAV to direct instructions.

Control center 122 may monitor external sources such as the news and law enforcement reports to detect events that require neutralization by one or more UAVs. For example, control center 122 may detect a riot at a particular location. Control center 122 may refer to predetermined deployment schemes to select a number of UAVs to deploy. The predetermined deployment schemes may be functions of the number of people to potentially neutralize (e.g., the number of riot members), the weather (e.g., whether there are storm-like conditions), the number of law enforcement agents at the location, the distance to the location, and the number of UAVs currently available at UAV base 120 and/or mobile base 124 to deploy. For example, one scheme may indicate sending five UAVs if there are at most 10 individuals to neutralize, the weather forecast predicts rain, there are at most three police officers at the location, the distance is within 20 miles, and at least ten UAVs are available for deployment. Control center 122 may utilize, for example, a binary decision tree to arrive at a deployment scheme of the plurality of deployment schemes. In some aspects, there may be additional criteria for determining that number of UAVs to deploy, such as whether the location is in a rural or urban environment, and how many UAVs have historically been deployed in similar events (and whether or not the members of the event were neutralized successfully by the UAVs).

In some aspects, control center 122 may present an interface to operators 126, which are user(s) of control center 122. The interface may output all of the instructions that control center 122 recommends to be executed by each individual UAV. In response to receiving confirmations from operators 126 via the interface, control center 122 sends instructions to the UAV. This adds an additional layer of verification to ensure that the UAV does not execute an ill-advised instruction.

Figure 2A:
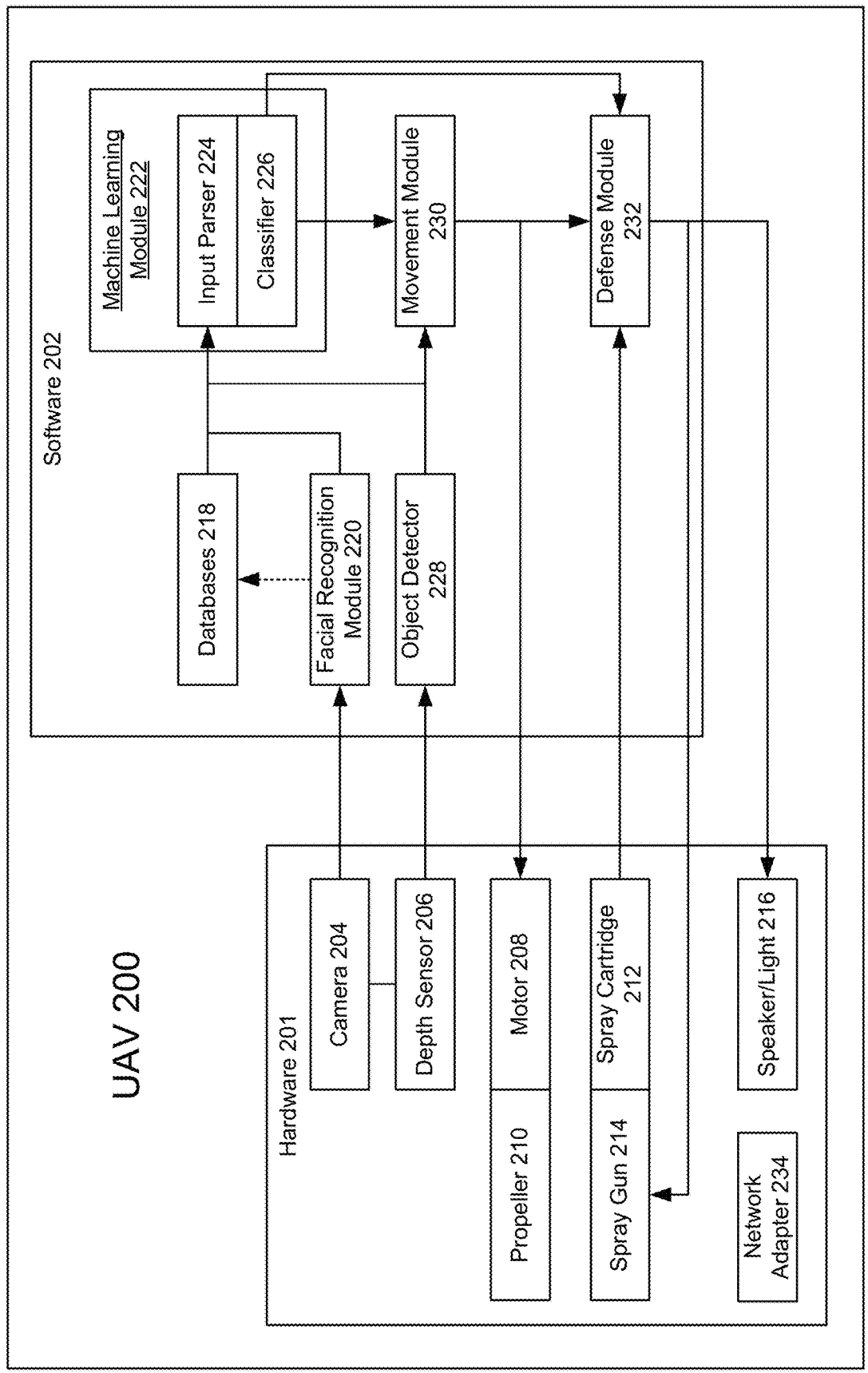
FIG. 2A is a block diagram illustrating components of the UAV, in accordance with aspects of the present disclosure.

FIG. 2A is a block diagram illustrating components of UAV 200, in accordance with aspects of the present disclosure. UAV 200 is the same as UAV 101 and is split into two portions: hardware 201 and software 202. Accordingly, the components of hardware 201 are comparable to the components described in UAV 101. Namely, camera 204 maps to camera 108, propeller 210 maps to propeller 102, motor 208 maps to motor 104, spray gun 214 maps to spray gun 112, spray cartridge 212 maps to cartridge 110, and speaker/light 216 maps to speaker/light 106. UAV 200 further includes depth sensor 206. In some aspects, depth sensor 206 is part of camera 204. In some aspects, depth sensor 206 is an individual piece of hardware in UAV 200.

A goal of UAV 200 is to neutralize a hostile individual harmlessly. In order to do that, the specific individual should be identified. Via camera 204 and depth sensor 206, UAV 200 detects an individual in an environment. Specifically, the acquired feeds are input into facial recognition module 220 and object detector 228. If facial recognition module 220 and/or object detector 228 identify a face and/or a human, UAV 200 can confirm that the environment has an individual (e.g., target 116).

UAV 200 may then assign an aggression factor to the individual based on motion data of the individual. For example, object detector 228 may be configured to monitor an amount of movement by target 116. Object detector 228 may identify the user in a first frame captured by camera 204 and determine the amount of pixels that change within a period of time. In some aspects, object detector 228 may generate a visual box around target 116 in a particular frame and assess the amount of pixels that change within a period of time within the target area. In order to remove outliers (e.g., changes in the background), object detector 228 may use computer vision techniques such as edge detection to generate a border around target 116 (the border conforming to target 116's body). All other pixels in the visual box that are outside of the border may be set to a constant value. Furthermore, object detector 228 may lock onto a specific body part of target 116. For example, object detector 228 may set target 116's nose as the center-point of the visual box, such that the boundary of the visual box is relative to a single point. Thus, a change in pixels represents that the user's body is moving. Theoretically, the more target 116's body moves (e.g., arms may flail and legs may kick), the more aggressive the user is classified as. The aggression factor may therefore be proportional to the amount of pixels that change in the visual box, given these image adjustments and lock-ons. This implies that if 70% of the pixels change, the aggression factor is 70%. The aggression factor may be compared with a pre-determined aggression threshold (e.g., 50%). In response to determining that the aggression factor is greater than an aggression threshold, UAV 200 prepares a neutralization action designed to reduce the aggression factor of the individual.

It should be noted that in some aspects, UAV 200 does not solely rely on the comparison of aggression factor with an aggression threshold to make a decision on whether to prepare a neutralization action. For example, object detector 228 may analyze gestures made my a user to determine whether a neutralization action should be taken. Gestures that trigger a neutralization action by UAV 200 include, but are not limited, a throwing motion (e.g., if target 116 attempts to throw an object at UAV 200), an attack attempt (e.g., if target 116 throws a punch or a kick), and a swinging motion. In some aspects, the presence of a weapon (e.g., a gun, a knife, a pole, etc.) may be identified by object detector 228. In response to detecting the presence of a weapon in possession by the individual, UAV 200 may prepare a neutralization action.

In order to detect gestures and weapons, object detector 228 may utilize machine learning module 222, which may comprise a plurality of machine learning algorithms. One algorithm may be used to identify gestures, wherein object detector 228 identifies an individual and provides motion data associated with the individual to input parser 224 along with a request to identify aggressive gestures. The algorithm to detect gestures may be trained based on a plurality of data structures comprising motion data (e.g., three-dimensional location coordinates of pivotal body parts such as hands, arms, legs, feet, and head as identified by object detector 228 and associated timestamps over a period of time) and classified gestures. Some of these gestures may be aggressive (e.g., throwing a punch), while other gestures may be non-aggressive (e.g., waving). Input parser 224 may take the raw data from object detector 228 and generate a data structure that is compatible with the gesture algorithm. Classifier 226, which represents the actual algorithms, stores pre-trained weights. Classifier 226 receives the parsed input data, applies its weights in accordance with a classification algorithm (e.g., Bayes classifier), and outputs whether a gesture is aggressive or non-aggressive.

In response to determining that an individual is being aggressive, UAV 200 prepares a neutralization action. A neutralization action can included, but is not limited to, (1) spraying a substance at the individual, (2) playing a sound, (3) aiming lights at the individual, (4) sending an image of the individual to legal enforcement, and (5) calling a legal enforcement officer.

A goal of this action is to calm the user down or to motivate the user to leave the environment. On a technical level, this is achieved with the aggression factor is driven down below the aggression threshold and/or when classifier 226 determines that the most recent motions of the individual feature non-aggressive gestures.

Another goal of the neutralization action is to ensure that no harm is actively done to the individual by UAV 200. Target individuals may have several medical conditions, which make them perceptible to harm. For example, using flashing lights may be harmful if the individual has a history of photosensitive seizures, playing loud sounds may be harmful if the individual uses a highly sensitive hearing aid, and spraying a particular substance at the individual may be harmful if the he/she is allergic to the substance or is perceptible to fainting if exposed to high concentrations of the substance. Long term effects are also very important. For example, the elderly, minors, and pregnant women are particularly sensitive to exposure of particular substances (e.g., pepper spray) and therefore, cannot be exposed to them to prevent problems in growth, development, lifespan longevity.

Other than medical conditions, an individual that is classified as aggressive, may in fact be part of a group of "very important persons" (VIPs) that should not be targeted. For example, the individual may be a law enforcement officer, a politician, a celebrity, etc. An individual may also be a someone who is part of group of dangerous individuals (e.g., known criminals and terrorists) that need to be arrested.

To meet these goals, UAV 200 identifies an exception condition of the individual. An exception condition refers to any attribute of the individual that can serve as a deterrent in using a particular neutralization action—specifically as the neutralization action may be ineffective, harmful, or may motivate a criminal to flee (thus evading arrest). Exception conditions may be any combination of age, disability, allergies, disease, pregnancy, reliance on medical equipment, VIP status, criminal status, and possession of a weapon.

In some aspects, UAV 200 may use facial recognition module 220 to determine an identifier of the user (e.g., name, ID number, etc.) by referring to a database that maps facial images to such identifiers. By comparing facial images and determining an identifier, facial recognition module 220 may refer to database 218, which comprises public medical records, criminal records, and VIP whitelists, to determine at least one exception condition. Database 218 may be pre-generated by control center 122, which collects information about a population from external sources such as hospitals, motor vehicle departments, law enforcement agencies, and the news. For example, drive license records can provide information on age and medical conditions such as the reliance on corrective vision and hearing. Law enforcement agencies can provide lists of individuals that need to be arrested, as well as names/photos of members of law enforcement. Control center 122 may generate whitelists (for VIP individuals that should not be targeted) and blacklists (for dangerous individuals) based on this information. To simplify the records, database 218 may be in the form of a data structure that answers "yes" or "no" questions for different fields. An example of this data structure is shown below:

TABLE 1

| | | | | | Database | | | | | |
|---|---|---|---|---|---|---|---|---|---|---|
| Individual | Age | Vision Impairment | Hearing Impairment | Mobility Impairment | Allergic to Substance X | Allergic to Substance Y | Black-listed | White-listed | Ownership of Weapons | Pregnant |
| John Doe | 35 | No | No | No | Yes | No | No | No | No | No |

For any given individual, each field above where a "yes" is present is considered an exception condition. In some aspects, age may be classified as an exception condition if it is below 18 years old or above 65 years old (these numbers can be changed). It should be noted that the fields shown in the table above are only exemplary. The table may include additional fields such as dosage limits for a certain substance that the individual can withstand.

In some aspects, object detector 228 may be used to generate the database. For example, object detector 228 may analyze an image of the individual to identify physical attributes of the individual. Physical attributes comprise objects that can be used to predict the exception condition of the individual. For example, object detector 228 may identify objects indicating mobility impairment (e.g., crutches, wheelchairs, etc.), hearing impairment (e.g., hearing aid), and vision impairment (e.g., sunglasses and a cane). Physical attributes further comprise the age, height, weight, and visual anomalies (e.g., a cast, neck brace, missing limbs, etc.). In some aspects, depth sensor 206 may be used to approximate the height of the user and approximate weight (based on volume as calculated by the depth sensor). Furthermore, camera 204 may capture a facial image of the user and determine, using an age-approximating algorithm in machine learning module 222, an age of the individual. Input parser 224 may receive the height, weight, and facial image of the individual, and classifier 226 may output an age as a function of these three inputs (e.g., the algorithm may be trained on a plurality of pre-classified images, heights and weights, of a population).

Suppose that an individual has been identified by the facial recognition module 220. A record of the individual may not be found in database 218 by UAV 200. In response to determining that the record is not found, object detector 228 and machine learning module 222 may create a record for the individual in database 218. Object detector 228 may detect an asthma pump in the individual's hands. Based on the height, weight, and facial features, the individual's age may be approximated to 25. The following record may thus be generated:

TABLE 2

New Entry in Database

| Individual | Age | Vision Impairment | Hearing Impairment | Mobility Impairment | Potentially Harmed by Airborne Substances | Armed | Pregnant |
|---|---|---|---|---|---|---|---|
| Person X | 25 | No | No | No | Yes | No | No |

It should be noted that just as certain neutralization actions may be harmful to an individual, some neutralization actions may be ineffective. For example, if the exception condition of an individual indicates that he/she is blind, using lights against the individual will not mitigate the individual's aggression. Similarly, if the individual is legally deaf, playing a loud sound will be ineffective.

UAV 200 may monitor, via defense module 232, a plurality of neutralization actions that UAV 200 is capable of performing. For each action, defense module 232 may store additional information about the action such as what medical conditions the action is ineffective and harmful towards. The additional information may also include capacity and battery life data. For example, spray cartridge 212 may track how much of a spray has been used already and how much remains. Similarly speaker/light 216 and spray gun 214 may be used sparingly based on the amount of battery life of the UAV. In some aspects, battery may be reserved for each of these actions. Defense module 232 may store this data in a data structure. An exemplary data structure is shown below:

TABLE 3

| Neutralization Actions | | | | | |
|---|---|---|---|---|---|
| Action | Current Battery/ Capacity | Harms | In- effective | Pri- ority | De- pletion Rate |
| Light | 25% | Seizure-prone | Visually Impaired | 3 | 0.5% |
| Speaker | 25% | Sensitive ears | Hearing Impaired | 4 | 0.1% |
| Spray Substance | 70% | Allergic Airborne | | 1 | 2% |

TABLE 3-continued

| Neutralization Actions | | | | | |
|---|---|---|---|---|---|
| Action | Current Battery/ Capacity | Harms | In- effective | Pri- ority | De- pletion Rate |
| X | | Substance-prone Elder Minor | | | |
| Spray Substance Y | 10% | Elder Minor | | 2 | 2% |
| Call Authorities | 4/5 Signal Reception | | | 5 | |

Table 3 is only exemplary. One skilled in the art would appreciate that additional or fewer actions may be available to any UAV. UAV 200 selects, from the plurality of neutralization actions that the UAV is capable of performing, a neutralization action that does not harm the individual based on the exception condition and is effective towards the individual.

In some aspects, each action is assigned a priority value. When assessing which action to choose, UAV 200 may select the action with the most priority (i.e., 1, followed by 2, 3, 4, and 5). For example, UAV 200 may first consider spraying substance X on the individual classified in table 2. Person X has asthma and is classified as being prone to airborne substances according to table 2. Therefore, UAV will not select spraying substance X (e.g., a gas with a pungent odor). UAV 200 may then consider spraying substance Y on Person X. Because there are no indications of harmfulness and there is enough capacity, UAV 200 may spray substance Y (e.g., water) on Person X.

In some aspects, for individuals in whitelists and blacklists, UAV 200 may select a predetermined neutralization action. For example, for VIP individuals in a whitelist, UAV 200 may not perform any neutralization action. In contrast, for dangerous individuals in a blacklist, UAV 200 may immediately contact law enforcement.

In terms of spraying each spray cartridge 212 may start with 100% of each substance. As actions are used, this capacity may deplete at a depletion rate. In this particular example, selecting the spray option on an individual depletes 2% of the full capacity for that particular substance in spray cartridge 212. Likewise, flashing lights on an individual depletes 0.5% of the allotted battery and sounding the speakers depletes 0.1% of the allotted battery. In terms of calling the authorities, UAV 200 may access, using network adapter 234, a network such as the Internet or a mobile network. The signal strength (or connection strength) of the network may be rated out of five. In this particular example, the signal strength is 4 of 5. UAV 200 may compare this value with a signal strength threshold (e.g., 1 of 5). If the signal strength is below the threshold, UAV 200 may be unable to use that action. For example, UAV 200 may be in a location (e.g., a forest) where texting and calling are not possible due to poor reception.

In some aspects, subsequent to performing the neutralizing action, UAV 200 determines whether the aggression factor of the individual has decreased below the aggression threshold based on the motion data within a period of time. For example, UAV 200 may spray target 116 (which may be Person X) with substance 114 (which may be substance X). After a period of time, such as 30 seconds, UAV 200 may reassess the aggression factor of target 116 using the methods discussed previously. In response to determining that the aggression factor has not decreased below the aggression threshold, UAV 200 may perform a secondary neutralizing action from the plurality of neutralization actions. For example, if target 116 is still yelling and making offensive motions (e.g., kicking), UAV 200 may select an action with the next highest priority that is effective against target 116 and does not harm him/her. According to table 3 and 2, the next action will be flashing lights at target 116 (e.g., to disrupt his/her vision).

In some aspects, when the neutralization action involves spraying a substance at an individual, UAV 200 determines, using a depth sensor 206, a location of the individual and a distance between the individual and UAV 200. For example, UAV 200 may set the position of the depth sensor 206 as an origin point (P1) in three-dimensional space (x1, y1, z1) where x1=y1=z1=0. The position of the individual (e.g., the nose of the individual) (P2) may be assigned a three-dimensional coordinate (x2, y2, z2) relative to the origin point. The distance between the origin point and x2, y2, z2 may be determined using a distance formula:

$$d(P_1,P_2)=\sqrt{(x_2-x_1)^2+(y_2-y_1)^2+(z_2-z_1)^2}.$$

UAV 200 may further calculate a projection vector indicating a direction at which to spray the substance. UAV 200 may determine a concentration of the substance that is safe for the individual based on the exception condition. For example, if the distance between P1 and P2 is smaller than a threshold distance (e.g., 1 foot), the force at which a substance such as pepper spray is sprayed may be very harmful to the individual. This is because the concentration of the substance is too high. As the distance between the P1 and P2 increases, the substance dilutes in the air and is less concentrated.

In some aspects, defense module 232 may determine a relationship between the concentration of a substance and the distance between P1 and P2. Based on this relationship, UAV 200 may adjust the distance between the individual and UAV 200 to achieve a desired concentration. In some aspects, the desired concentration may be listed in database 218 for a specific individual. In some aspects, the desired concentration is universal such that a specific distance has to be maintained for all individuals when spraying the particular substance. Movement module 230 receives the distance information and sends instructions to motor 208 and propeller 210 to enable the desired movement (e.g., left, right, up, down). Accordingly, UAV 200 sprays the substance along the projection vector such that the individual is exposed to the desired concentration.

In some aspects, depth sensor 206 may acquire motion data that indicates, over a period of time, that the individual is moving (e.g., running or walking). In order to lock-on to the individual, when calculating the projection vector, UAV 200 determines an anticipated location of the individual. For example, the individual may be moving 3 miles per hour toward P3 in the three-dimensional space. UAV 200 may determine that in a predetermined amount of time (e.g., 5 seconds), based on the individual's movements, the individual will be at P4. UAV 200 thus determines the projection vector to be along a position of the UAV (P1) and the anticipated location (P4). In 5 seconds, UAV 200 sprays the substance at the desired concentration—by maintaining a particular distance-towards P4. Based on the individual's movements, the individual should thus be exposed to the substance.

In some aspects, object detector 228 may also identify obstacles in the path between the individual and UAV 200. The positions of the obstacles are sent to movement module 230, which determines a route for moving towards the individual and sends instructions to propeller 210 and motor 208 accordingly.

Figure 2B:
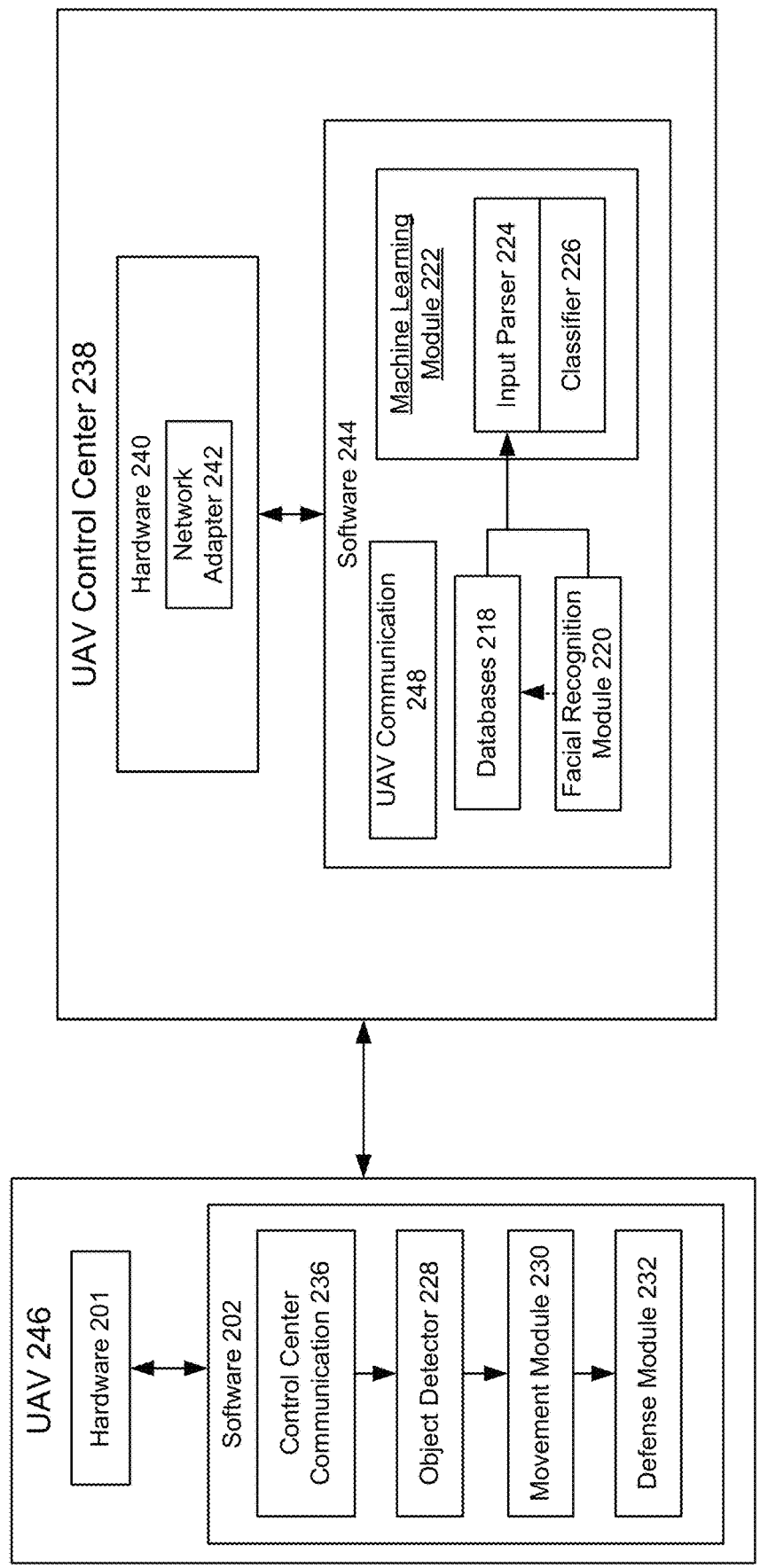
FIG. 2B is a block diagram illustrating components of a UAV that communicates with a control center, in accordance with aspects of the present disclosure.

FIG. 2B is a block diagram illustrating components of UAV 246 that communicates with UAV control center 238, in accordance with aspects of the present disclosure. In some aspects, the modules shown in software 202 of FIG. 2A may be thin client applications that communicate with counterpart applications on one or more servers of control center 238 (same as control center 122). For example, rather than image analysis and machine learning computations being performed on-board on UAV 200, UAV 200 may comprise network adapter 234 which may communicate with one or more servers over a network (e.g., the Internet) to perform the computations and provide results.

In FIG. 2B, UAV 246 represents a simplified version of UAV 200 of FIG. 2A. In FIG. 2A, UAV 200 performed all computations and processing on-board via software 202. Software 202 of UAV 246, however, shifts modules such as database(s) 218, facial recognition module 220, and machine learning module 222 to software 244 of UAV control center 238. Components of hardware 201 may be shared by both UAV 200 and UAV 246. Hardware 240 of control center 238 may comprise network adapter 242, which is configured to transmit and receive network traffic such as instructions and data, respectively.

The module named control center communication 236 may be configured to receive and parse instructions from control center 238. Control center communication 236 may also create messages with payloads holding raw data collected from hardware 201 (to transmit to control center 238). The module named UAV communication 248 may be configured to receive the messages, and distribute them to modules 218, 220, and 222, accordingly (e.g., image data may be forwarded to facial recognition module 220). UAV communication 248 may also be configured to receive information from modules 218, 220, and 222, and generate instructions for transmittal to UAV 246. For example, an instruction may be to perform a certain neutralization action, to track an individual's location (e.g., a criminal), to move to a different location, etc.

Object detector 228 may be used to avoid collisions with neighboring UAVs in a plurality of UAVs. Object detector 228 may forward collision detection information to movement module 230, which performs the necessary movements to avoid a collision. For example, object detector 228 may determine that a neighboring UAV is within a threshold distance (e.g., 3 feet) and thus, UAV 246 should move to a different location. In some aspects, movement instructions may be received from control center 238, which is configured to monitor the individual locations of all UAVs deployed and prevent collisions.

Figure 3:
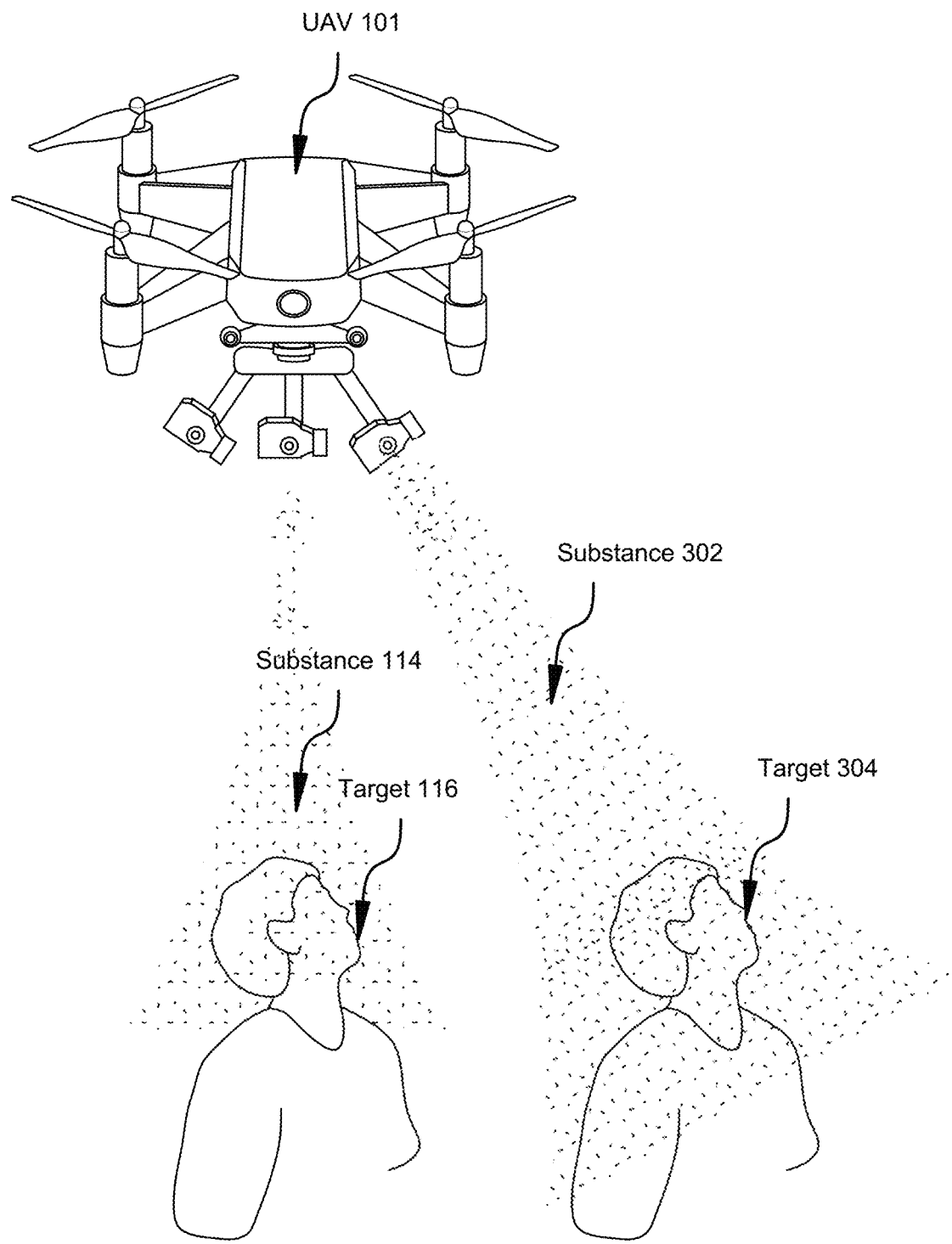
FIG. 3 illustrates a scenario for neutralizing a plurality of hostile individuals with different defense mechanisms, in accordance with aspects of the present disclosure.

FIG. 3 illustrates scenario 300 for neutralizing a plurality of hostile individuals with different defense mechanisms, in accordance with aspects of the present disclosure. Up until now, the focus has been towards a single individual (e.g., target 116). However, the systems and methods described in FIGS. 1 and 2 are applicable in scenarios involving a plurality of hostile individuals.

In scenario 300, in addition to target 116, there exists target 304. In some aspects, UAV 101 may detect at least one other individual in the plurality of hostile individuals (e.g., target 304). UAV 101 may determine (e.g., using camera 204, facial recognition module 220, object detector 228, and machine learning module 222) that an aggression factor of the at least one other individual is also greater than the aggression threshold. Accordingly, UAV 101 may identify another exception condition of the at least one other individual. For example, UAV 101 may refer to the database 218 to identify the exception condition of target 304. UAV 101 may then select, from the plurality of neutralization actions, another neutralization action that does not harm the at least one other individual based on the another exception condition.

Suppose that UAV 101 holds two substances in its cartridge: substance 114 (e.g., pepper spray) and substance 302 (e.g., water). UAV 101 may determine that any of its neutralizing actions can be used on target 116 without harming target 116. However, for target 304, UAV 101 may determine from the database that target 304 is allergic to pepper spray. Due to this, UAV 101 may choose to spray target 304 with water.

In some aspects, UAV 101 may perform the another neutralization action by the UAV simultaneously with the neutralization action. For example, UAV 101 may identify target 116 and target 304. UAV 101 may then identify each target's exception condition and select an appropriate neutralization action. Subsequent to the selection, UAV 101 may perform both actions simultaneously.

In some aspects, UAV 101 may select a single target from a plurality of hostile individuals and perform the steps of identifying the target, detecting aggression, determining the exception condition, selecting an action, and performing the action. Subsequent to performing the action, UAV 101 may direct its attention to a different target of the plurality of hostile individuals and perform the above-identified steps for that target. In some aspects, UAV 101 may evaluate the aggression factors of all individuals in the plurality of hostile individuals and rank each individual based on the aggression factors to ensure that the most hostile individuals are properly neutralized before moving onto the next target.

In some aspects, UAV 101 may perform the above-identified steps for different targets in a pipeline such that, for example, when determining the exception condition for target 116, UAV 101 may already be spraying substance 302 on target 304. This enables UAV 101 to neutralize multiple targets efficiently because for some targets, UAV 101 may take a longer time determining an exception condition, or may need to perform additional movements to reach the target.

Figure 4:
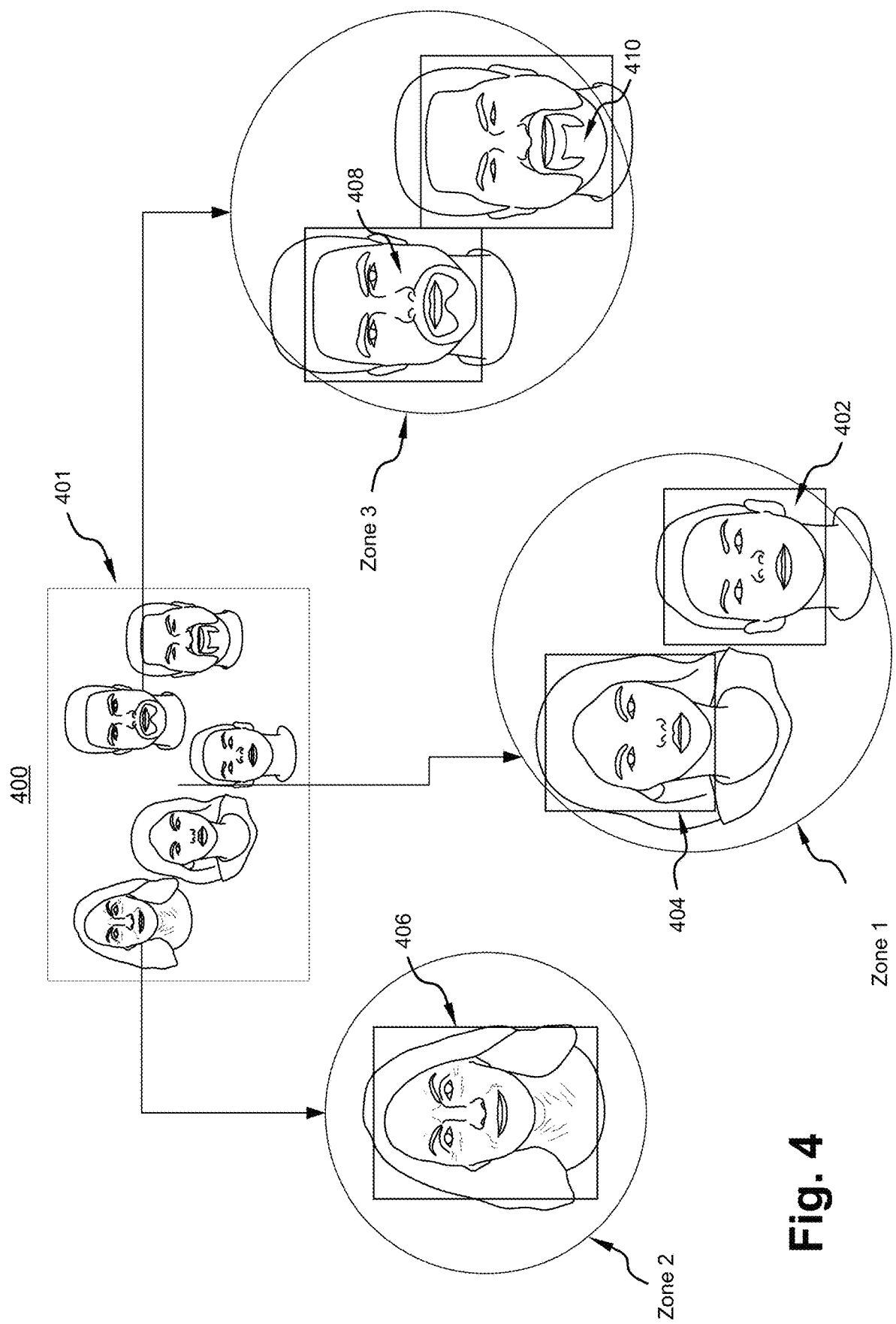
FIG. 4 illustrates a scenario for neutralizing a plurality of hostile individuals based on zones, in accordance with aspects of the present disclosure.

FIG. 4 illustrates scenario 400 for neutralizing a plurality of hostile individuals based on zones, in accordance with aspects of the present disclosure. In certain scenarios, there may be several individuals in the plurality of hostile individuals. Thus, performing an action on each target individually may be inefficient. In scenario 400, UAV 101 captures feed 401. Feed 401 may be a real-time video feed, a frame of a video, or a captured photo at a specific time. Using object detector 228 and facial recognition module 220, UAV 101 may identify each individual 402, 404, 406, 408, and 410. For each individual, UAV 101 may further identify an exception condition.

UAV 101 may then compare the exception conditions of each individual to identify individuals with matching exception conditions. For example, the respective exception conditions determined by UAV 101 may indicate that individual 406 is an elderly woman that has sensitive ears, individuals 402 and 404 are children, and individuals 408 and 410 are healthy adults without any exception conditions. Based on the exception conditions, UAV 101 may generate zones 1, 2, and 3. As depicted in scenario 400, zone 1 comprises the children, zone 2 comprises the elderly woman, and zone 3 comprises the adult men.

When generating the zones, UAV 101 may utilize camera 208 and computer vision techniques such as edge detection to group individuals in close proximity (within a threshold radial distance such as 5 feet). In some aspects, UAV 101 also determines whether individuals with matching exception conditions are not separated by another individual that is either non-aggressive or with a different exception condition. For example, if the elderly woman stood between the two children, UAV may determine that zone 1 cannot be created because of the differing exception condition. In that case, three zones would be created—one for each of individuals 402, 404, and 406.

Subsequent to generating the zones, UAV 101 selects and performs a neutralization action. For example, UAV 101 may spray pepper spray in zone 3, may play a loud sound directed specifically at zone 1, and may flash a spotlight at zone 2.

Figure 5:
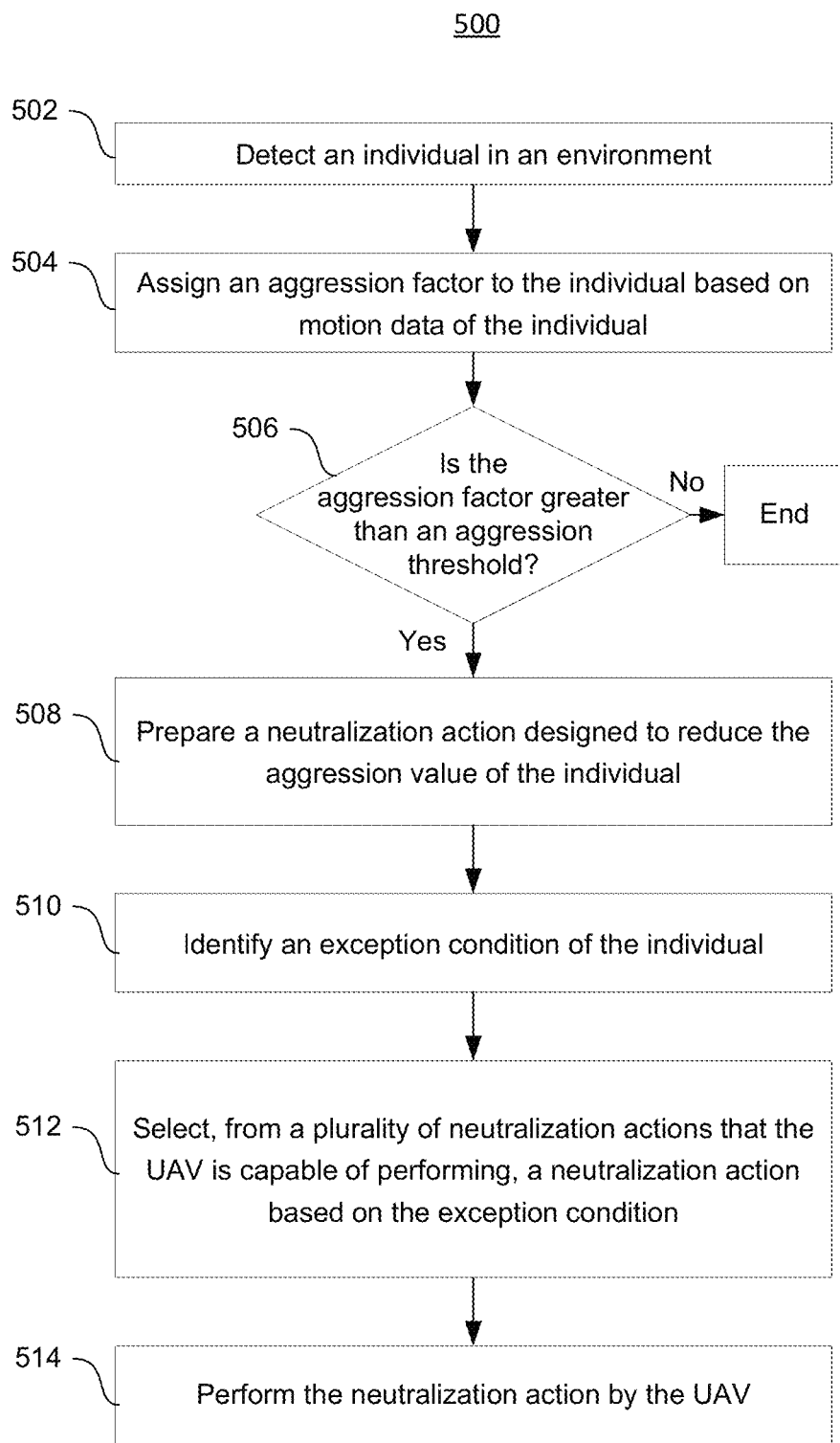
FIG. 5 illustrates a flow diagram of a method for neutralizing a hostile individual harmlessly using a UAV, in accordance with aspects of the present disclosure.

FIG. 5 illustrates a flow diagram of method 500 for neutralizing a hostile individual harmlessly using a UAV, in accordance with aspects of the present disclosure. At 502, UAV 101 detects an individual in an environment. At 504, UAV 101 assigns an aggression factor to the individual based on motion data of the individual. At 506, UAV 101 determines whether the aggression factor is greater than an aggression threshold. In response to determining that the factor is not greater than the threshold, method 500 ends.

However, in response to determining that the factor is greater than the threshold, method 500 advances to 508, where UAV 101 prepares a neutralization action designed to reduce the aggression factor of the individual. At 510, UAV 101 identifies an exception condition of the individual. At 512, UAV 101 selects, from a plurality of neutralization actions that the UAV is capable of performing, a neutralization action based on the exception condition. At 514, UAV 101 performs the neutralization action.

Figure 6:
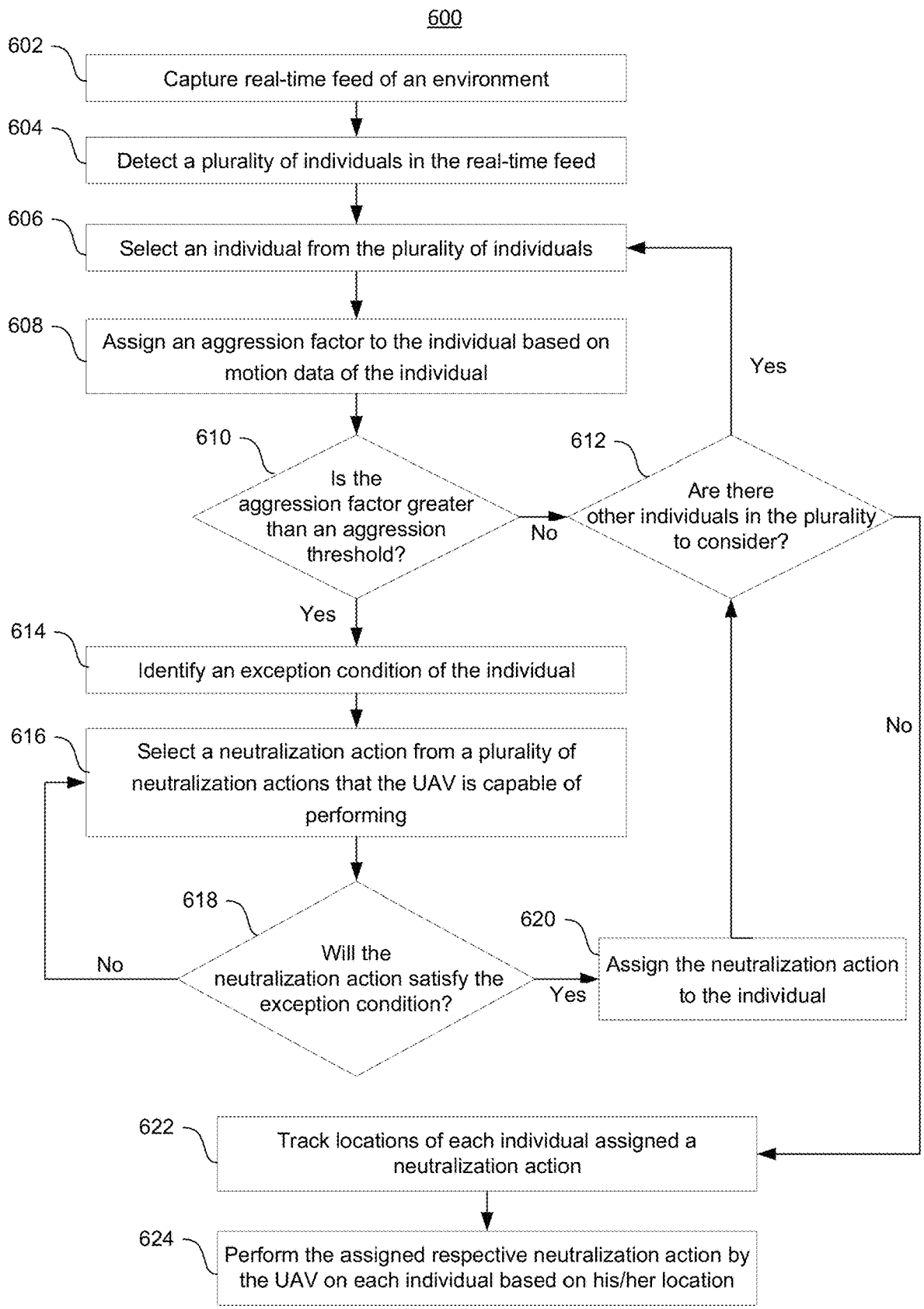
FIG. 6 illustrates a flow diagram of a method for neutralizing a plurality of hostile individuals, in accordance with aspects of the present disclosure.

FIG. 6 illustrates a flow diagram of method 600 for neutralizing a plurality of hostile individuals, in accordance with aspects of the present disclosure. At 602, UAV 101 captures real-time feed of an environment. At 604, UAV 101 detects a plurality of individuals in the real-time feed. At 606, UAV 101 selects an individual from the plurality of individuals.

At 608, UAV 101 assigns an aggression factor to the individual based on motion data of the individual. At 610, UAV 101 determines whether the aggression factor is greater than an aggression threshold. In response to determining that the value is not greater than the threshold (i.e., no neutralization action is needed for that particular individual, method 600 advances to 612, where UAV 101 determines whether there are other individuals in the plurality to consider. For example, the plurality of individuals may comprise 10 individuals. The first of those individuals may not show any aggression.

In response to determining that there are other individuals to consider, method 600 returns to 606. Suppose that at 610, UAV 101 determines that the value is greater than the threshold. Accordingly, method 600 advances to 614, where UAV 101 identifies an exception condition of the individual. At 616, UAV 101 selects a neutralization action from a plurality of neutralization actions that the UAV is capable of performing.

For example, UAV 101 may be capable of performing six different actions. UAV 101 may select the first action of the six. At 618, UAV 101 determines whether the neutralization action will satisfy the exception condition. If the action will not satisfy the condition, method 600 returns to 616, where UAV 101 selects a different action (e.g., the second of the six). In response to determining that the action will satisfy the exception condition, at 620, UAV 101 assigns the neutralization action to the individual. In the event that the loop between 616 and 618 reaches the last action, UAV 101 automatically assigns that neutralization action to the individual. This last-resort action may be un-harmful for any individual (such as taking a photo and sending it to the authorities or saving the photo in memory for later access, when for example, there is reception and the photo can be sent) and thus may be a universal action (i.e., satisfies all exception conditions).

From 620, method 600 returns to 612, where UAV 101 determines whether there are other individuals to consider in the plurality of individuals. If no other individuals are left, method 600 proceeds to 622, where UAV 101 track the locations of each individual assigned a neutralization action. At 624, UAV 101 performs the assigned respective neutralization action by the UAV on each individual based on his/her location. For example, UAV 101 may determine the 3D coordinates of the respective individuals and then perform an action such as spray a respective individual by aiming the spray gun towards the location of the respective individual.

Figure 7:
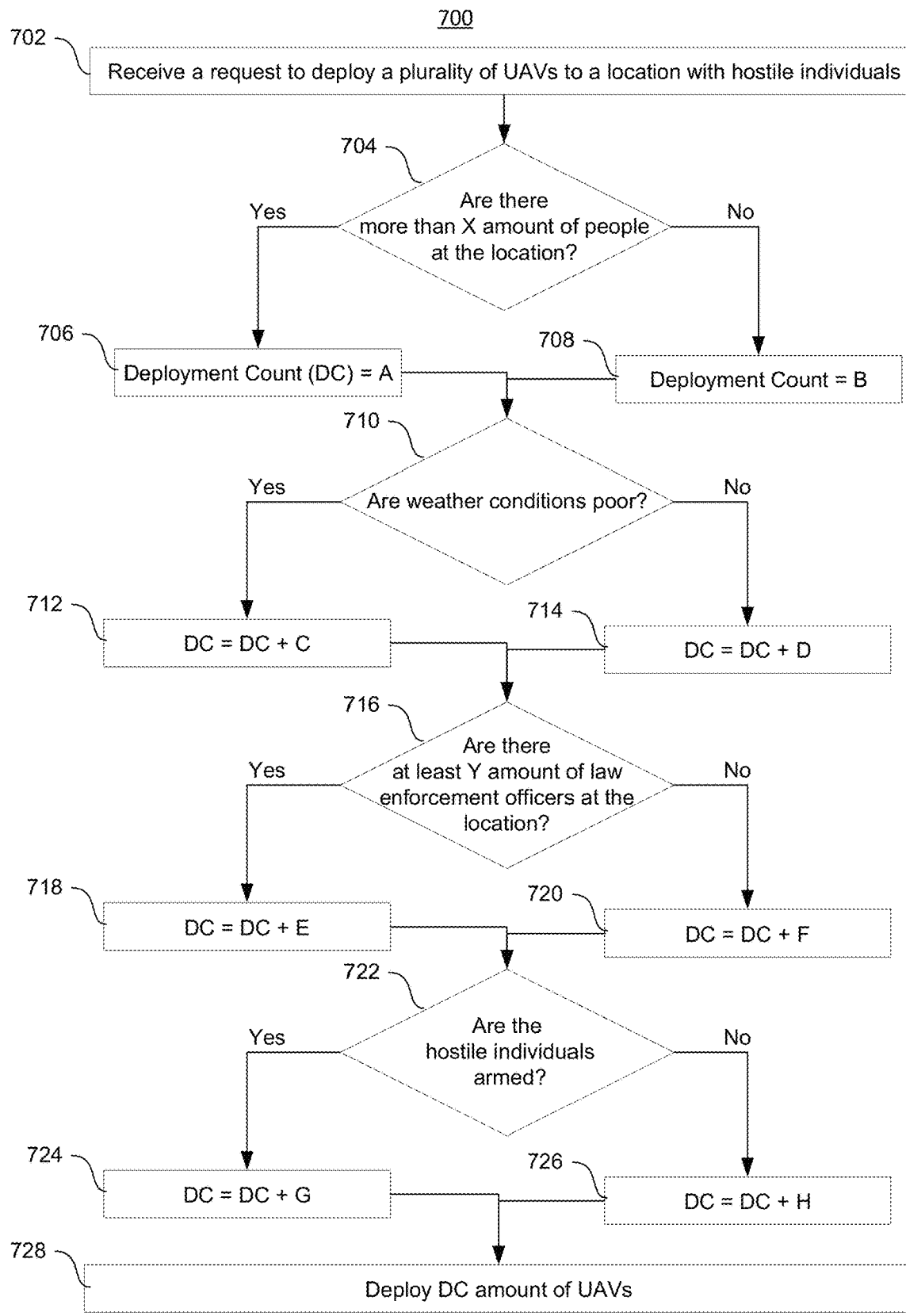
FIG. 7 illustrates a flow diagram of a method for deploying a plurality of UAVs, in accordance with aspects of the present disclosure.

FIG. 7 illustrates a flow diagram of method 700 for deploying a plurality of UAVs, in accordance with aspects of the present disclosure. It should be noted that method 700 is only an example of how control center 122 may decide on the number of UAVs to deploy. For example, control center 122 may consider additional factors, or may refer to predetermined schemes as discussed in FIG. 1B.

At 702, control center 122 receives a request to deploy a plurality of UAVs to a location with hostile individuals. At 704, control center 122 determines whether there are more than X amount of people (e.g., X=5) at the location. In response to determining that there are, method 700 advances to 706, where the deployment count (DC) is set to A (e.g., A=X=5). If there are not, method 700 advances to 708, where DC is set to B (e.g., B=3), which may be less than A.

From 706 and 708, method 700 advances to 710, where control center 122 determines whether weather conditions are poor (e.g., it is raining, is heavily windy). If conditions are poor, at 712 control center 122 increments DC by C (e.g., C=3). If conditions are not poor, at 714, control center 122 increments DC by D, which may be less than C (e.g., D=0).

From 712 and 714, method 700 advances to 716, where control center 122 determines whether there are at least Y amount of law enforcement officers at the location. In response to determining that there are, at 718, control center 122 increments DC by E (e.g., E=1). In response to determining that there are not, control center 122 increments DC by F, which may be greater than E (e.g., F=3).

From 718 and 720, method 700 advances to 722, where control center 122 determines whether hostile individuals are armed by weapons. In response to determining that they are, at 724, control center 122 increments DC by G (e.g., G=5). In response to determining that they are not, at 726, control center 122 increments DC by H, which may be less than G (e.g., G=1).

At 728, control center 122 deploys DC amount of UAVs from base 120 and/or mobile base 124. In some aspects, control center 122 may deploy UAVs iteratively based on the tentative DC. For example, control center 122 may deploy a single UAV to scout the location. As the single UAV sends back information (e.g., weather conditions, number of hostile individuals, number of officers, number of armed individuals), control center 122 may continuously deploy more UAVs. For example, after setting DC to A at 706, control center 122 may deploy A amount of UAVs. Subsequently, control center 122 may deploy an additional C UAVs at 712.

Figure 8:
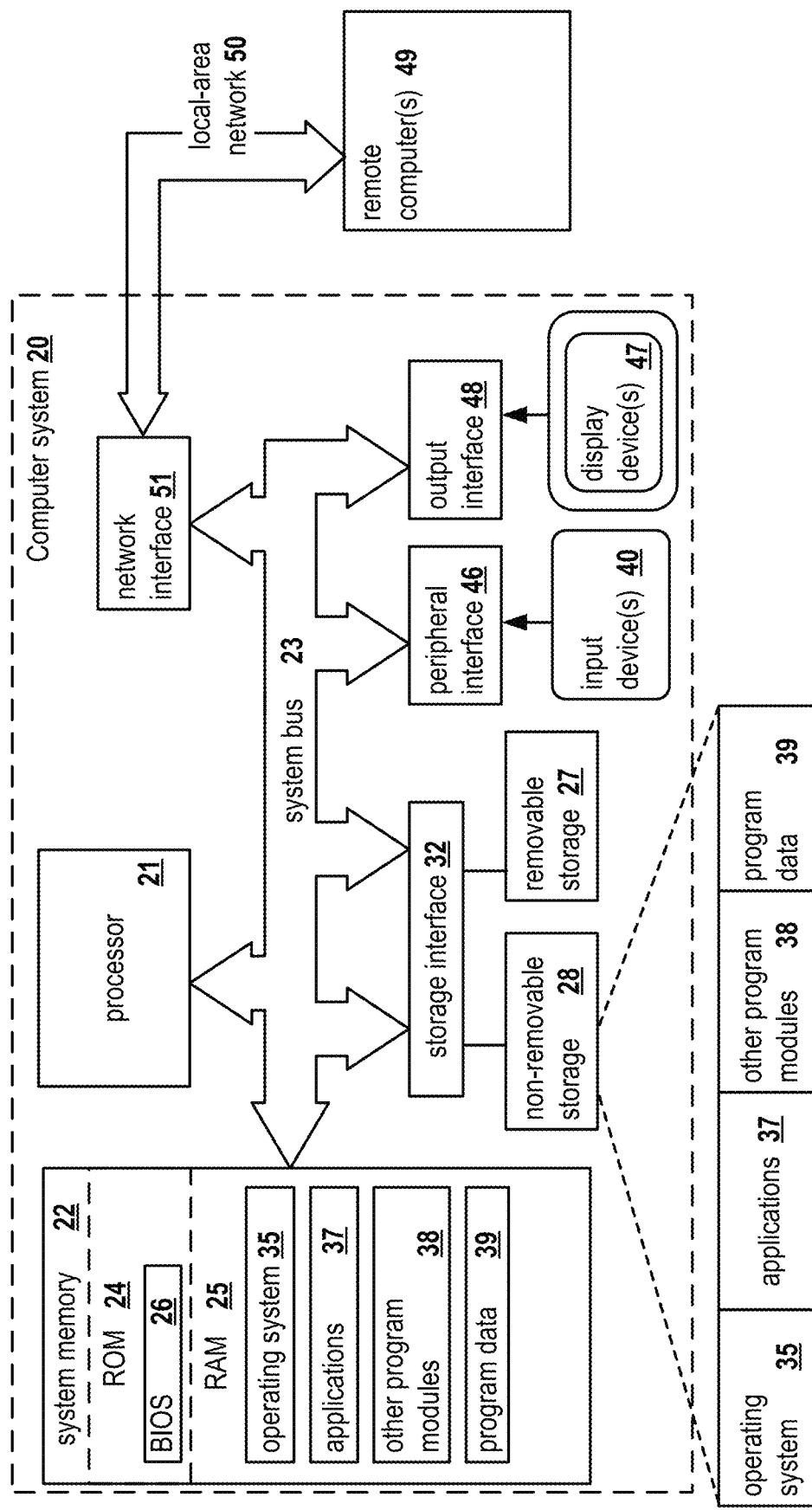
FIG. 8 presents an example of a general-purpose computer system on which aspects of the present disclosure can be implemented.

FIG. 8 is a block diagram illustrating a computer system 20 on which aspects of systems and methods for neutralizing hostile individuals harmlessly using unmanned aerial vehicles (UAVs) and systems and methods for deploying and controlling of a fleet of such UAVs may be implemented in accordance with an exemplary aspect. The computer system 20 can be in the form of multiple computing devices, or in the form of a single computing device, for example, UAV 200. For example, UAV 200's hardware 201 may include computer system 20 for performing software 202 and integrating the different modules of software 202 with periphery devices such as camera 204 and motor 208. In some aspects, computer system 20 may be comprised in UAV control center 238.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1A-7 may be performed by processor 21. Processor 21 may be a part of hardware 201 or hardware 240. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for subduing target individuals using unmanned aerial vehicles (UAVs), the method comprising:
    deploying one or more UAVs to a location of an individual;
    obtaining information about the individual from the one or more UAVs and external sources;
    assigning an aggression factor to the individual based on the obtained information;
    in response to determining that the aggression factor is greater than an aggression threshold, preparing a neutralization action designed to reduce the aggression factor of the individual by:
        identifying one or more exception conditions of the individual; and
        selecting, from a plurality of neutralization actions that the one or more UAVs are capable of performing, a neutralization action based on the one or more exception conditions, wherein the neutralization action comprises spraying a substance at the individual;
        determining a concentration of the substance that is safe for the individual based on the exception condition and a distance between the individual and the one or more UAVs; and
    instructing the one or more UAVs to perform the selected neutralization action on the individual by spraying the substance such that the individual is exposed to the determined concentration.

2. The method of claim 1, wherein identifying the one or more exception conditions of the individual comprises:
    capturing a facial image of the individual;
    determining an identifier of the individual by performing facial recognition on the facial image;
    generating a whitelist database of VIP individuals from the external sources, wherein neutralization actions cannot be performed on the VIP individuals; and
    determining that the identifier is in the whitelist database, wherein the one or more exception conditions indicates that the individual is a VIP individual.

3. The method of claim 1, wherein identifying the one or more exception conditions of the individual comprises:
    capturing a facial image of the individual;
    determining an identifier of the individual by performing facial recognition on the facial image;
    generating a blacklist database of dangerous individuals from the external sources;
    determining that the identifier is in the blacklist database, wherein the one or more exception conditions indicates that the individual is a dangerous individual.

4. The method of claim 1, wherein identifying the one or more exception conditions of the individual comprises:
    capturing a facial image of the individual;
    determining an identifier of the individual by performing facial recognition on the facial image;
    searching for, in a medical database, medical records of the individual using the identifier; and
    identifying the one or more exception conditions in the medical records of the individual.

5. The method of claim 1, wherein identifying the exception condition of the individual comprises:
    capturing an image of the individual;
    identifying, using object recognition, physical attributes of the individual; and
    predicting the exception condition based on the physical attributes of the individual.

6. The method of claim 1, wherein the individual is a part of a plurality of target individuals in the location, further comprising:
    detecting at least one other individual in the plurality of target individuals;
    determining that an aggression factor of the at least one other individual is greater than the aggression threshold;
    identifying another exception condition of the at least one other individual; and
    selecting, from the plurality of neutralization actions, another neutralization action for the at least one other individual based on the another exception condition; and
    instructing the one or more UAVs to perform the another neutralization action simultaneously with the neutralization action, wherein the neutralization action is different than the another neutralization action.

7. The method of claim 6, wherein the neutralization action comprises spraying a first substance at the individual using a first spray gun of a UAV and the another neutralization action comprises spraying a second substance at the at least one other individual using a second spray gun of the UAV, wherein the second substance is not the same as the first sub stance.

8. The method of claim 1, further comprising:
    determining, using a depth sensor, a location of the individual and the distance between the individual and the one or more UAVs;
    calculating a projection vector indicating a direction at which to spray the substance;
    adjusting the distance between the individual and the one or more UAVs to achieve the concentration; and
    spraying the substance along the projection vector such that the individual is exposed to the determined concentration.

9. The method of claim 8, wherein calculating the projection vector further comprises:

determining an anticipated location of the individual, based on the obtained information of the individual, wherein the obtained information comprises motion data; and setting the projection vector along a position of the one or more UAVs and the anticipated location.

10. The method of claim 1, wherein the exception condition comprises at least one of:
   (1) age,
   (2) a disability,
   (3) an allergy,
   (4) a disease,
   (5) a pregnancy,
   (6) reliance on medical equipment,
   (7) a VIP status,
   (8) a criminal status, and
   (9) possession of a weapon.

11. The method of claim 1, further comprising:
   subsequent to performing the neutralizing action, determining whether the aggression factor of the individual has decreased below the aggression threshold based on motion data within a period of time; and
   in response to determining that the aggression factor has not decreased below the aggression threshold, performing a secondary neutralizing action from the plurality of neutralization actions.

12. The method of claim 1, wherein the plurality of neutralization actions comprises:
   (1) spraying a substance at the individual,
   (2) playing a sound,
   (3) aiming lights at the individual,
   (4) sending an image of the individual to legal enforcement, and
   (5) calling a legal enforcement officer.

13. A system for subduing target individuals using unmanned aerial vehicles (UAVs), the system comprising:
   at least one processor of a control center configured to:
   deploy one or more UAVs to a location of an individual;
   obtain information about the individual from the one or more UAVs and external sources;
   assign an aggression factor to the individual based on the obtained information;
   in response to determining that the aggression factor is greater than an aggression threshold, prepare a neutralization action designed to reduce the aggression factor of the individual by:
      identifying one or more exception conditions of the individual; and
      selecting, from a plurality of neutralization actions that the one or more UAVs are capable of performing, a neutralization action based on the one or more exception conditions, wherein the neutralization action comprises spraying a substance at the individual;
      determining a concentration of the substance that is safe for the individual based on the exception condition and a distance between the individual and the one or more UAVs; and
   instruct the one or more UAVs to perform the selected neutralization action on the individual by spraying the substance such that the individual is exposed to the determined concentration.

14. The system of claim 13, wherein the at least one processor is configured to identify the one or more exception conditions of the individual by:
   capturing a facial image of the individual;
   determining an identifier of the individual by performing facial recognition on the facial image;
   generating a whitelist database of VIP individuals from the external sources, wherein neutralization actions cannot be performed on the VIP individuals; and
   determining that the identifier is in the whitelist database, wherein the one or more exception conditions indicates that the individual is a VIP individual.

15. The system of claim 13, wherein the at least one processor is configured to identify the one or more exception conditions of the individual by:
   capturing a facial image of the individual;
   determining an identifier of the individual by performing facial recognition on the facial image;
   generating a blacklist database of dangerous individuals from the external sources;
   determining that the identifier is in the blacklist database, wherein the one or more exception conditions indicates that the individual is a dangerous individual.

16. The system of claim 13, wherein the at least one processor is configured to identify the one or more exception conditions of the individual by:
   capturing a facial image of the individual;
   determining an identifier of the individual by performing facial recognition on the facial image;
   searching for, in a medical database, medical records of the individual using the identifier; and
   identifying the one or more exception conditions in the medical records of the individual.

17. The system of claim 13, wherein the at least one processor is configured to identify the exception condition of the individual by:
   capturing an image of the individual;
   identifying, using object recognition, physical attributes of the individual; and
   predicting the exception condition based on the physical attributes of the individual.

18. The system of claim 13, wherein the individual is a part of a plurality of target individuals in the location, and wherein the at least one processor is further configured to:
   detect at least one other individual in the plurality of target individuals;
   determine that an aggression factor of the at least one other individual is greater than the aggression threshold;
   identify another exception condition of the at least one other individual; and
   select, from the plurality of neutralization actions, another neutralization action for the at least one other individual based on the another exception condition; and
   instruct the one or more UAVs to perform the another neutralization action simultaneously with the neutralization action, wherein the neutralization action is different than the another neutralization action.

19. The system of claim 18, wherein the neutralization action comprises spraying a first substance at the individual using a first spray gun of a UAV and the another neutralization action comprises spraying a second substance at the at least one other individual using a second spray gun of the UAV, wherein the second substance is not the same as the first sub stance.

20. A non-transitory computer readable medium storing thereon computer executable instructions for subduing target individuals harmlessly using unmanned aerial vehicles (UAVs), comprising instructions for:
   deploying one or more UAVs to a location of an individual;

obtaining information about the individual from the one or more UAVs and external sources;

assigning an aggression factor to the individual based on the obtained information;

in response to determining that the aggression factor is greater than an aggression threshold, preparing a neutralization action designed to reduce the aggression factor of the individual by:

identifying one or more exception conditions of the individual; and selecting, from a plurality of neutralization actions that the one or more UAVs are capable of performing, a neutralization action based on the one or more exception conditions, wherein the neutralization action comprises spraying a substance at the individual;

determining a concentration of the substance that is safe for the individual based on the exception condition and a distance between the individual and the one or more UAVs; and instructing the one or more UAVs to perform the selected neutralization action on the individual by spraying the substance such that the individual is exposed to the determined concentration.

\* \* \* \* \*